United States Patent [19]
Johnson

[11] Patent Number: 5,996,852
[45] Date of Patent: Dec. 7, 1999

[54] SALT CONVEYING SYSTEM FOR WATER SOFTENER

[76] Inventor: Paul J. Johnson, 3837 Nagawicka Shores Dr., Hartland, Wis. 53029

[21] Appl. No.: 09/151,363

[22] Filed: Sep. 10, 1998

[51] Int. Cl.⁶ .............................. B67D 5/06; G01F 11/20; B65G 1/00
[52] U.S. Cl. .................................... 222/181.2; 222/185.1; 222/413; 414/326
[58] Field of Search ..................................... 414/299, 326; 222/129, 185.1, 181.1, 181.2, 413

[56] References Cited

U.S. PATENT DOCUMENTS

| | | | |
|---|---|---|---|
| 2,863,575 | 12/1958 | Vasold | 414/299 |
| 2,973,319 | 2/1961 | Porter | 210/33 |
| 3,244,561 | 4/1966 | Mihara et al. | 127/46 |
| 3,722,715 | 3/1973 | Young | 414/326 |
| 5,151,000 | 9/1992 | Geraghty et al. | 414/187 |
| 5,498,115 | 3/1996 | Perneborn | 414/326 |
| 5,553,744 | 9/1996 | Sawyer, III | 222/413 |

*Primary Examiner*—Joseph A. Kaufman
*Assistant Examiner*—Keats Quinalty

*Attorney, Agent, or Firm*—Andrus, Sceales, Starke & Sawall

[57] ABSTRACT

A material transport system for conveying water softener salt to a water softener brine tank located within a structure is disclosed. The material transport system includes a loading hopper having a removable lid that is secured to or adjacent a wall of the structure. Salt is fed into the upper end of the loading hopper and travels through the hopper to the lower end of the hopper where a downwardly sloping gravity feed sleeve is connected to the loading hopper. The feed sleeve is formed of a non-corrosive material and extends from the loading hopper through floors and walls of the structure to a lower level of the structure. At its lower end, the feed sleeve is connected to a storage hopper suspended in the lower level of the structure by a hanging framework attached to the underside of a floor of the structure located directly above the storage hopper. The feed sleeve is attached adjacent the upper end of the storage hopper, allowing the salt to migrate through the storage hopper to a dispensing spout connect to the lower end of the storage hopper. The dispensing spout is, in turn, connected to a feed mechanism located beneath the storage hopper. The feed mechanism includes a connecting sleeve forming the exterior of the mechanism and containing a feed system used to selectively dispense the salt from the feed mechanism through a tank sleeve connected between the feed mechanism and the water softener brine tank.

33 Claims, 2 Drawing Sheets

SALT CONVEYING SYSTEM FOR WATER SOFTENER

FIELD OF THE INVENTION

The present invention relates to devices used to convey materials in pellet, granulated, or other small particle form from a loading apparatus located on or near a wall of a building-like structure to a device positioned within the interior of the structure where the material is utilized for a specific purpose. More specifically, the present invention is directed to a material transport system for conveying a water softener salt, such as common salt, from a loading hopper located adjacent a wall of a house to a water softener brine tank located in the basement of the house.

BACKGROUND OF THE INVENTION

The prior art hopper devices used to supply material to an apparatus for use in the apparatus generally concerned themselves with solving the problem of dispensing the material from a loaded hopper into the apparatus. These devices solved this problem in various ways. The device of the Mihara et al. U.S. Pat. No. 3,244,561 connected a hopper directly to an opening in the top surface of a tank via a valve located at the bottom end of the hopper to selectively dispense the material held within the hopper into the tank. The device of Porter U.S. Pat. No. 2,973,319 discloses an inlet pipe, including a shut-off valve, leading from a hopper to the upper portion of a tank in which the material is deposited. As with the Mihara '561 device, this valve allows for selective dispensing of that material from the hopper into the apparatus where the material is used. Geraghty et al. U.S. Pat. No. 5,151,000 discloses a reciprocating feed plate, located underneath the bottom opening of a hopper, that is used to urge the feed material from the hopper into an adjacent device for use.

While these devices are useful in dispensing material from large hoppers, they are impractical for smaller scale applications, such as dispensing salt into a water softener brine tank. Furthermore, none of these prior art patents discloses any apparatus or means that may be used to place the material into the hopper. In large-scale applications, material can be loaded into a hopper by a piece of heavy machinery, such as a crane or the like. However, when a hopper is utilized as part of a much smaller application, such as to supply water softener salt to a household water softener system, the problem of loading the material into the hopper becomes more difficult to solve. For example, in most instances, a brine tank of a water softener system can be loaded only by an individual, or individuals, carrying containers of the material, typically 40–80 lb. bags of salt, to the water softener system in the basement of a house and manually dumping the salt into the tank. As containers of the salt can weigh significant amounts, this method may be beyond the capacity of a large segment of the population due to the weight of the salt bags and the height of the tanks, who then must find another way to load the salt. Furthermore, if a storage hopper is used with the system, so that the brine tank does not need to be continuously loaded by hand as the salt level recedes, the hopper is normally positioned higher than the brine tank to facilitate dispensing of the salt, forcing an individual to raise the salt container even higher for the material to be placed in the hopper.

SUMMARY OF THE INVENTION

It is an object of the present invention to provide a material transport system for conveying salt from an easily accessible loading hopper located on or adjacent a wall of a building-like structure to a water softening system located at a lower level in the building-like structure.

It is a further object of the invention to supply a selectively operable feed mechanism within the system that allows for an individual to control of the amount of salt supplied to the water softening system brine tank.

It is another object of the present invention to provide a material transport system that is of simple construction and easy to install and maintain.

In accordance with the present invention, a material transport system is provided for supplying a household water treatment system with a water softener salt. The system includes a loading hopper positioned on or adjacent a wall of the house on the interior or exterior of the house. The loading hopper is formed of a non-corrosive material and is generally frustoconical in shape, with an open, wide loading end being positioned above an open, narrow dispensing end. The loading hopper also has a lid removably secured over the loading end opening by a set of hinges fixedly secured to both the lid and the loading hopper.

Located in the interior of the house at a level below that of the loading hopper is a storage hopper. The storage hopper is larger than the loading hopper, is formed of a non-corrosive material and has an upper, receiving end and a lower, dispensing end. The storage hopper is comprised of an upper cylindrical section and a lower frustoconical section from which the salt held in the storage hopper is dispensed. A cover is fixedly secured over the upper cylindrical section of the storage hopper. The storage hopper receives the incoming salt from the loading hopper and holds it until such time as the salt is needed. As some of the salt may adhere to the wall of the storage hopper, a vibrator motor may be attached to the storage hopper to shake the salt loose from the storage hopper, allowing all of the salt to be dispensed.

The storage hopper is supported in the interior of the house by a hanging framework. The framework comprises a support beam attached to the lower surface of a floor of the house, and a set of suspension rods connected to, and depending from, the support beam. The support beam is fixedly attached to a number of floor joists located in the floor, and includes a number of suspension rod openings along its length. The suspension rods are secured to the support beam and to the upper end of the storage hopper through matching openings in the edge of the cover on the storage hopper, the rim of the storage hopper and the openings in the support beam by a set of bolts threadably mounted to both ends of the suspension rods. With this hanging framework, the storage hopper can be supported in an elevated position above the basement floor and above the water softener brine tank to facilitate the transport of the salt from the storage hopper into the brine tank.

A cylindrical, downwardly sloping gravity feed tube is connected between and directs the salt from the loading hopper to the storage hopper. The feed tube is formed of a non-corrosive material that may be flexible or rigid and extends from the dispensing end of the loading hopper, through feed tube openings formed in an exterior wall and/or floor of the house, into the basement of the house for connection to the storage hopper. As the feed tube extends in a downward direction throughout its entire length, gravity forces the salt from the loading hopper downwardly into the storage hopper.

A dispensing spout is attached to and depends from the narrow end of the lower frustoconical section of the storage hopper to direct the salt from the storage hopper. The dispensing spout has an inlet end attached to the storage hopper and an outlet end through which the salt is dispensed. Also, the dispensing spout is formed of a non-corrosion material that may be flexible or rigid, depending on the specific application.

Attached to the outlet end of the dispensing spout is a feed mechanism used to control the amount of salt supplied to the water softener brine tank. The feed mechanism includes a generally cylindrical, downwardly sloping connecting sleeve, having a pair of spaced upper and lower ends and formed of a non-corrosive material, and a feed system contained within the connecting sleeve. The connecting sleeve is open at its lower end, allowing incoming salt to flow out of the connecting sleeve. The feed system disposed in the connecting sleeve can be any mechanism capable of metering controlled amounts of salt from the storage hopper into the brine tank. However, the feed system normally comprises a rotatable auger-type device that extends substantially the entire length of the connecting sleeve. The feed system can be activated by the use of any means that allows for selective operation of the feed system. Preferably, a crank handle connected along the axis of rotation of the auger and extending outside the connecting sleeve through a small opening in the closed, upper end of the connecting sleeve is used, allowing the feed system to be rotated within the connecting sleeve. The crank handle may be manually activated or can be actuated by a selectively operable motor connected to the crank handle. Opposite the crank handle, at the open end of the connecting sleeve, the connecting sleeve is secured to a tank sleeve that depends downwardly from the connecting sleeve and is connected at its opposite end directly to the water softener brine tank.

According to a further aspect of the invention, a material transport system is provided in which the gravity feed tube is connected directly to the feed mechanism. In this embodiment of the invention, the storage hopper is eliminated, allowing salt loaded into the loading hopper to immediately be transported by the feed tube to the feed mechanism for controlled dispensing into the water softener via the feed mechanism.

According to still another aspect of the invention, a material transport system is provided in which the gravity feed tube is connected directly between the loading hopper and the brine tank of the water softener system. The storage hopper and feed mechanism are eliminated, thus reducing the space taken up by the device in the interior of the house.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

The present invention is an improved system whereby an individual can supply salt to a brine tank utilized in a water softening system within a house.

Figure 1:
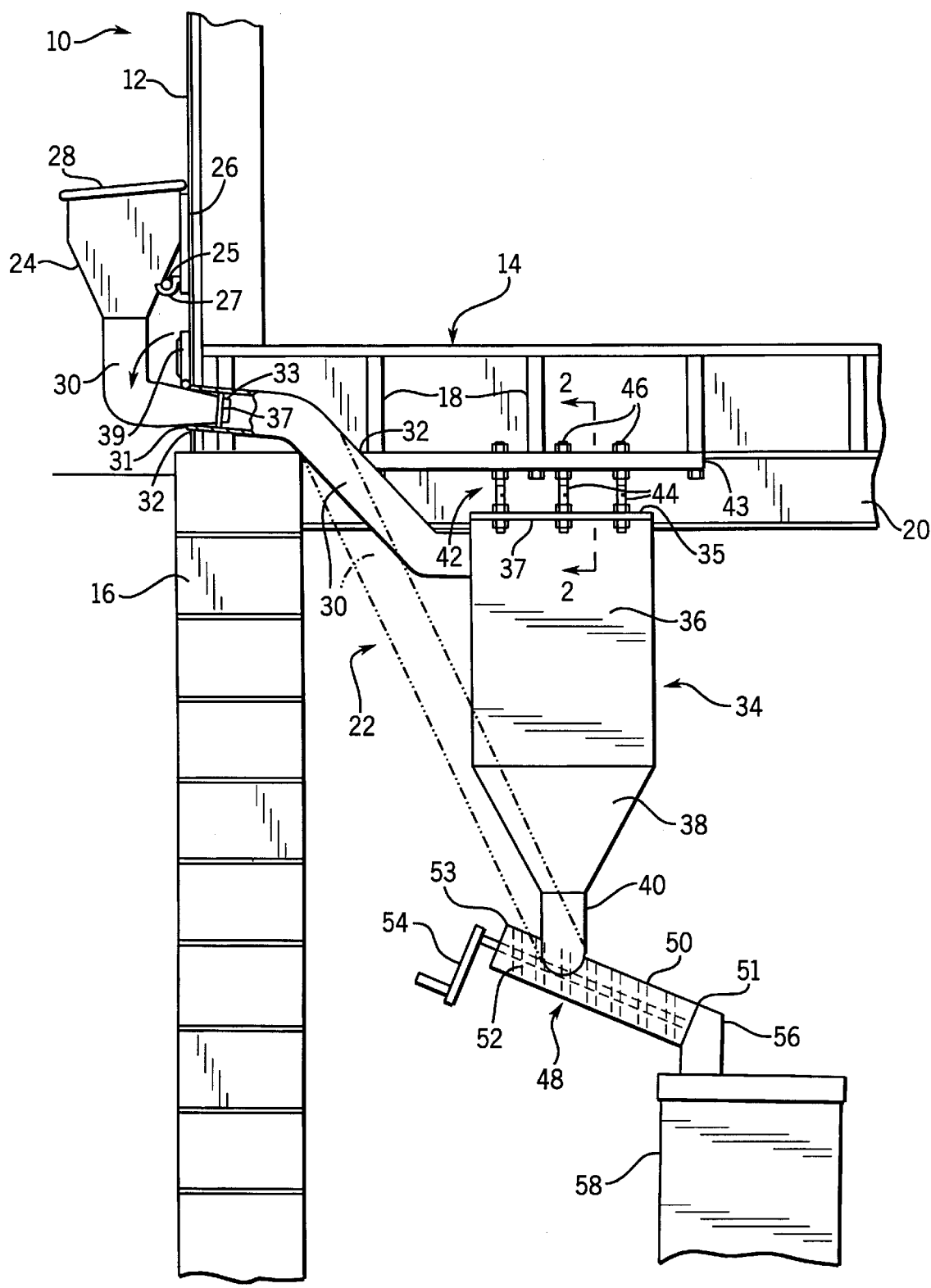
FIG. 1 is a side plan view of a salt transport system constructed according to the present invention.

Referring now to FIG. 1, a material transport system, indicated generally at 22, is shown as assembled in a house 10. The house 10 includes an exterior wall 12, a floor 14, including a number of floor joists 18, a foundation 16 beneath exterior wall 12 and an I-beam extending from foundation 16 beneath floor 14 to provide support for floor 14.

Material transport system 22 includes a loading hopper 24. Loading hopper 24 is formed from a non-corrosive material and is generally frusto-conical in shape, tapering from top to bottom. Loading hopper 24 is mounted to exterior wall 12 of house 10 by a mounting plate 26 secured to exterior wall 12. Any suitable means can be utilized to secure mounting plate 26 to exterior wall 12, and loading hopper 24 to mounting plate 26. Loading hopper 24 may also be positioned adjacent exterior wall 12 on a framework of some sort able to support loading hopper 24. Loading hopper 24 includes a lid 28 secured over the upper end of loading hopper 24. Lid 28 is normally fastened to loading hopper 24 by a set of hinges (not shown) secured between lid 28 and loading hopper 24 by a number of threaded fasteners inserted through openings in the hinges into both loading hopper 24 and lid 28.

The bottom end of loading hopper 24 is rigidly secured in a conventional manner to a feed sleeve 30. Feed sleeve 30 is also formed of a non-corrosive material and transports the salt fed into loading hopper 24 to the interior of house 10. Feed sleeve 30 can be formed of either a rigid or a flexible non-corrosive material. A rigid material is able to better withstand wear from regular usage and damage from the outside elements where the feed sleeve 30 is exposed. A flexible material allows for easier installation and may incorporate a number of angled sleeve elbows (not shown) that hold the feed sleeve 30 in a desired configuration within the system. Feed sleeve 30 is downwardly sloping throughout its entire length, allowing gravity to act on the salt within feed sleeve 30 to force the salt along sleeve 30 and away from loading hopper 24. Sleeve 30 extends into house 10 through exterior wall 12 and floor 14 through a pair of feed sleeve openings 32 in exterior wall 12 and floor 14.

At its lower end, sleeve 30 is rigidly connected in a suitable manner to a storage hopper 34. Storage hopper 34 is located in house 10 under floor 14 and adjacent foundation 16 below the level of loading hopper 24. Storage hopper 34 is formed of a rigid, durable non-corrosive material and is comprised of an upper cylindrical section 36 and a lower frustoconical section 38. A storage hopper lid 35 is secured over the top end of cylindrical section 36 of storage hopper 34 to prevent any incoming salt from spilling out of storage hopper 34. Storage hopper lid 35 is circular in shape and has a diameter slightly larger than cylindrical section 36 to form a flange 37 extending over the entire circumference of cylindrical section 36.

Figure 2:
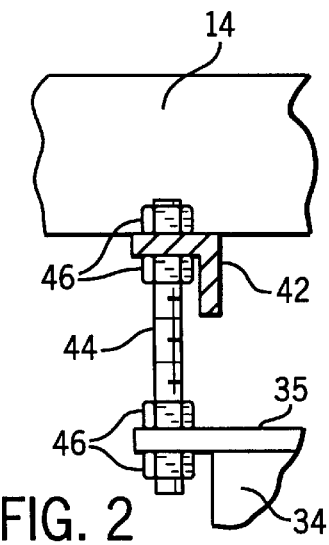
FIG. 2 is a cross-sectional view taken along line 2—2 of FIG. 1.

As shown in FIGS. 1 and 2, storage hopper 34 is suspended below floor 14 by a hanging framework 42. Framework 42 includes a support beam 43 that is connected to a number of floor joists 18 in floor 14. Hanging framework 42 also includes a number of suspension rods 44 that are secured between support beam 43 and storage hopper 34. Support beam 43 and flange 37 include a number of suspension rod openings (not shown) into which suspension rods 44 are inserted. As shown in FIG. 2, suspension rods 44 are secured between storage hopper lid 35 and support beam 43 by a number of bolts 46 threadably engaged on suspension rod 44 on each side of both storage hopper lid flange 37 and support beam 43. In this manner, storage hopper 34 is supported below floor 14 in an elevated arrangement above the remainder of material transport system 22 such that incoming salt is acted on by gravity and forced out of storage hopper 34 when material transport system 22 is employed. In order to prevent the salt from becoming attached to the sides of storage hopper 34, a vibrator motor (not shown) may be placed on the exterior of storage hopper 34 to shake loose any salt that has become attached to the sides of storage hopper 34.

Referring now to FIG. 1, a dispensing spout 40 extends from the opening in lower frustoconical section 38 of storage hopper 34. Spout 40 may be formed of either a rigid or flexible non-corrosive material and directs the salt from storage hopper 34 in a generally downward direction away from storage hopper 34 from its receiving end 39 to its outlet end 41. A feed mechanism 48 used to selectively dispense the salt from storage hopper 34 into a brine tank 58 is attached at the outlet, dispensing end of dispensing spout 40. Feed mechanism 48 is comprised of a cylindrical connecting sleeve 50 formed of a rigid non-corrosive material and a feed system 52 enclosed within the connecting sleeve. Connecting sleeve 50 has one open end 51 and a closed end 53. Sleeve 50 is connected in a conventional manner to the outlet of tubular spout 40 adjacent closed end 53. Connecting sleeve 50 also slopes downwardly from closed end 53 to open end 51.

Feed system 52 preferably is an auger-type arrangement having an axis of rotation that is the same as the center line of connecting sleeve 50. Feed system 52 can be activated using a crank handle 54 extending through closed end 53 of connecting sleeve 50. Crank handle 54 can be activated manually or may be attached to a motor (not shown) for automatic operation. Connecting sleeve 50 is attached to a tank sleeve 56 at open end 51. In operation, feed system 52 receives incoming salt from tubular spout 40 of storage hopper 34 and moves the salt downward to open end 51 of connecting sleeve 50. The salt exits sleeve 50 and is directed by tank sleeve 56 into brine tank 58 for use in the water softening system. Tank sleeve 56 depends directly downward from connecting sleeve 50 and into brine tank 58.

In another embodiment of the invention shown in phantom in FIG. 1, storage tank 34 and hanging framework 42 may be removed entirely, such that feed sleeve 30 connects directly at its lower end with connecting sleeve 50.

Figure 3:
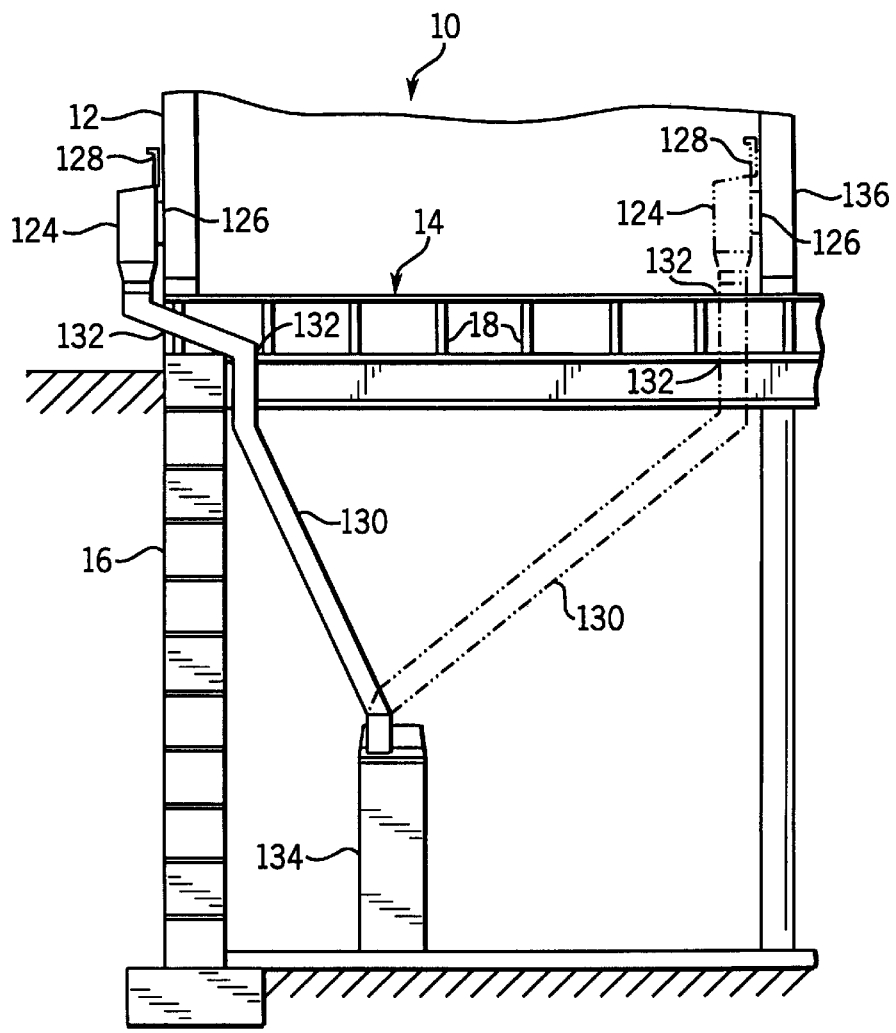
FIG. 3 is a side plan view of a second embodiment of a salt transport system constructed according to the present invention.

Referring now to FIG. 3, a third embodiment of the present invention is shown. In this embodiment, a storage hopper 124 is connected to an exterior wall 12 of a house 10 by a mounting plate 126 secured between loading hopper 124 and exterior wall 12. Loading hopper 124 is formed of a non-corrosive material and includes a lid 128 secured to the top end of loading hopper 124 by a set of hinges (not shown). Attached to the lower end of loading hopper 124 is a feed sleeve 130. Feed sleeve 130 extends downwardly throughout its entire length and enters house 10 through a pair of feed sleeve openings 132 in exterior wall 12 and a floor 14 of house 10. Feed sleeve 130 is connected opposite loading hopper 124 directly to a brine tank 134 located in house 10 adjacent a foundation 16 of house 10.

In an alternative structure to this embodiment, loading hopper 124 can be positioned on an interior wall 136 of house 10 as shown in phantom in FIG. 3.

In either of the foregoing embodiments, it may be desirable to provide a storage hopper 24 or 124 which is demountably attached to the wall on which it is mounted. Also, the upper end of the feed sleeve 30 or 130 should be separated from the lower end at the feed sleeve openings 32 or 132.

Referring for example to FIG. 1, the loading hopper 24 may have a horizontal mounting bar 25 attached to its rear wall which is received in a pair of mounting hooks 27 attached to or adjacent the mounting plate 26. The feed tube 30 is separated into two pieces at a joint 31 at the feed sleeve opening 32. The upper end of the feed sleeve 30 is provided with a tapered lower end 33 which fits into the lower portion of the feed sleeve when the loading hopper 24 is mounted on the exterior wall 12. Either the outside of the tapered end 33 or the inside of the lower portion of the feed sleeve at the joint 31 may be provided with an annular seal 37. To close the opening at the joint 31 when the hopper 24 is removed from its mounting, a hinged cover 39 may be pivoted down to close the feed sleeve opening 32.

Various alternatives and embodiments are contemplated as being within the scope of the following claims particularly pointing out and distinctly claiming the subject matter regarded as the invention.

I claim:

1. An apparatus for conveying water softener salt to a water softener storage tank located in the interior of a structure comprising:

a loading hopper located adjacent a wall of the structure and having open top and bottom ends;

a removable lid secured over the top end of the loading hopper;

a storage hopper having a top and a bottom end that is located in the interior of the structure below the level of the loading hopper and is secured to the structure;

a downwardly sloping gravity feed sleeve having a pair of spaced ends, the feed sleeve being connected at one end to the bottom end of the loading hopper, extending through an exterior wall of the structure into the interior of the structure, and being connected at its other end adjacent the upper end of the storage hopper; and a feed mechanism including:

a downwardly sloping connecting sleeve having a pair of spaced ends, a feed system disposed within the connecting sleeve including an actuation device attached to the system that extends to the outside of the connecting sleeve, wherein the connecting sleeve is attached to the bottom end of the storage hopper adjacent the upper end of the connecting sleeve and at the end of the connecting sleeve opposite the storage hopper to the storage tank.

2. The apparatus of claim 1 wherein the actuation device of the feed mechanism is a manual actuation device.

3. The apparatus of claim 2 wherein the feed mechanism comprises an auger disposed within the connecting sleeve.

4. The apparatus of claim 3 wherein the manual actuation device is a crank handle extending through the upper end of the connecting sleeve.

5. The apparatus of claim 4 wherein the lid is removably secured to the top end of the loading hopper by a set of hinges.

6. The apparatus of claim 5 wherein the loading hopper is connected directly to a wall of the structure.

7. The apparatus of claim 6 wherein the loading hopper has a generally frustoconical shape.

8. The apparatus of claim 1 wherein the storage hopper is formed from a non-corrosive material.

9. The apparatus of claim 1 wherein the feed sleeve is comprised of a rigid material.

10. The apparatus of claim 1 wherein the storage hopper further comprises a lid secured over the top end of the storage hopper.

11. The apparatus of claim 10 wherein the storage hopper is secured to the underside of a floor of the structure by a hanging framework comprising a set of suspension rods secured to the storage hopper and the adjacent floor of the structure by a plurality of bolts threadably mounted to the ends of the suspension rods.

12. The apparatus of claim 11 wherein the storage hopper further comprises a cylindrical upper portion and a frustoconical lower portion.

13. The apparatus of claim 12 wherein a dispensing spout connects the storage hopper with the feed sleeve.

14. The apparatus of claim 13 wherein the feed sleeve, the connecting sleeve, the dispensing spout, and the tank sleeve are all formed of a non-corrosive material.

15. An apparatus for mechanically conveying water softener salt to a water softener brine tank in the interior of a structure comprising:

a loading hopper located adjacent a wall of the structure and having open top and bottom ends;

a removable lid secured over the top end of the loading hopper;

a feed mechanism including a downwardly sloping connecting sleeve having two spaced ends, a feed system disposed within the connecting sleeve and having an actuation device attached to the system that extends through a closed end of the connecting sleeve;

a downwardly sloping feed sleeve having a pair of spaced ends, connected at one end to the bottom end of the loading hopper, extending through the structure wall and the interior of the structures, and connected at its other end to the feed mechanism;

wherein the connecting sleeve is secured to the downwardly sloping feed sleeve adjacent the actuation device and is connected opposite the actuation device at an open end to a tank sleeve attached between the feed mechanism and the water softener brine tank.

16. The apparatus of claim 15 wherein the actuation device of the feed system is a manual actuation device.

17. The apparatus of claim 16 wherein the feed system comprises an auger disposed within the connecting sleeve.

18. The apparatus of claim 17 wherein the manual actuation device is a crank handle extending through the upper end of the connecting sleeve.

19. The apparatus of claim 15 wherein the lid is secured to the top end of the loading hopper by a set of hinges.

20. The apparatus of claim 19 wherein the loading hopper is connected directly to an exterior wall of the structure.

21. The apparatus of claim 20 wherein the loading hopper has a generally frustoconical shape.

22. The apparatus of claim 15 wherein the feed sleeve is comprised of a rigid material.

23. The apparatus of claim 15 wherein the feed sleeve, the connecting sleeve, and the tank sleeve are all formed of a non-corrosive material.

24. The apparatus of claim 15 wherein the connecting sleeve is secured to the structure and supported by a pair of legs extending from and attached to both sides of the connecting sleeve.

25. An apparatus for mechanically conveying water softener salt to a water softener brine tank in the interior of a house, comprising:

a loading hopper located adjacent a wall of the house and having open top and bottom ends;

a removable lid secured over the top end of the loading hopper; and a downwardly sloping gravity feed sleeve having a pair of spaced ends, connected at one end to the bottom end of the loading hopper, extending through an exterior wall of the house and connected to the water softener brine tank at the opposite end.

26. The apparatus of claim 25 wherein the loading hopper and feed sleeve are formed from a non-corrosive material.

27. The apparatus of claim 25 wherein the lid is secured over the top of the loading hopper by a set of hinges.

28. The apparatus of claim 27 wherein the loading hopper secured directly to the outside of the house.

29. The apparatus of claim 28 wherein the loading hopper has a generally frustoconical shape.

30. The apparatus of claim 25 wherein the feed sleeve is formed from a rigid material.

31. The apparatus as set forth in claim 25 wherein said loading hopper is demountably attached to the house and to said one end of the feed sleeve.

32. The apparatus as set forth in claim 31 including closure means for closing said one end of the feed sleeve when the loading hopper is detached.

33. The apparatus as set forth in claim 32 wherein said closure means comprises a hinged cover.

* * * * *